United States Patent [19]
Bernard

[11] Patent Number: 4,590,363
[45] Date of Patent: May 20, 1986

[54] CIRCUIT FOR CONTROLLING TEMPERATURE OF ELECTRIC SOLDERING TOOL

[75] Inventor: Jürgen Bernard, Schollbrunn, Fed. Rep. of Germany

[73] Assignee: ERSA Ernst Sachs KG GmbH & Co., Fed. Rep. of Germany

[21] Appl. No.: 497,200

[22] Filed: May 23, 1983

[30] Foreign Application Priority Data

Jul. 28, 1982 [DE] Fed. Rep. of Germany ....... 3228202

[51] Int. Cl.$^4$ .............................................. H05B 1/02
[52] U.S. Cl. .................... 219/497; 219/501; 219/508; 219/233; 323/235
[58] Field of Search ............... 219/494, 497, 499, 241, 219/233, 501, 507–510; 323/235, 236; 307/117

[56] References Cited

U.S. PATENT DOCUMENTS

| | | | |
|---|---|---|---|
| 3,745,308 | 7/1973 | Lefferts | 219/501 |
| 3,789,190 | 1/1974 | Orosy et al. | 219/497 |
| 3,881,085 | 4/1975 | Traister | 219/499 |
| 4,243,875 | 1/1981 | Chang | 219/497 |
| 4,350,876 | 9/1982 | Kubota et al. | 219/497 |

Primary Examiner—M. H. Paschall
Attorney, Agent, or Firm—McGlew and Tuttle

[57] ABSTRACT

In a circuit arrangement for controlling the operating temperature of the heating coil of an electric soldering iron, the resistance variation of the heating coil itself is to be evaluated at lowest possible cost of circuitry and doing away with a thermocouple sensor that used to be arranged in the region of the soldering bit or of the heating coil, at high mechanical cost. To this end, a precision resistor is inserted in the heating circuit and a TRIAC switching element connected between the latter and the heating element, which is switched open by a comparator circuit as a function of the voltage drop at the precision resistor or which lets through only the pulses of a pulse generator circuit required for measuring the switch-on threshold, which pulse generator circuit is synchronized via a null detection circuit for null passage of the AC voltage. The voltage drop is further compared with a preset voltage and when it is reached an integration capacitor is charged, the voltage of which controls the comparator in proportion to a reference voltage. The TRIAC is switched on as long as the voltage at the output of the integration exceeds the reference voltage, and is switched off as long as this voltage is lower than the reference voltage. In the latter case the integration capacitor forms a time function element for the reheating of the heating coil.

5 Claims, 2 Drawing Figures

CIRCUIT FOR CONTROLLING TEMPERATURE OF ELECTRIC SOLDERING TOOL

FIELD AND BACKGROUND OF THE INVENTION

The invention relates to a circuit arrangement for controlling the operating temperature of the heating unit of an electrical soldering tool, in particular, a soldering iron.

In electrical soldering irons it is known, e.g. from German patent document No. 26 46 705, how to arrange a thermocouple in the soldering bit and hence in the region of the heating unit, which serves as a heat sensor. The measurement data of the thermocouple are picked up and processed by means of a circuit arrangement and are used for controlling the operating temperature of the heating unit, which in the cited prior art consists of a heating coil. The arrangement of the thermocouple requires increased mechanical cost in the production of the soldering bit or of the soldering iron itself.

SUMMARY OF THE INVENTION

It is an object of the present invention to provide a circuit arrangement for controlling the operating temperature of the heating unit of an electrical soldering tool at minimum cost of circuitry while avoiding the arrangement of a heat sensor in the region of the soldering bit or of the heating unit of the soldering iron.

Accordingly, another object of the invention is to provide such a circuit arrangement which includes a series connected heating element, precision resistor and TRIAC acting as a switching element. The TRIAC switching element is controlled by a comparator which opens the TRIAC as a function of a voltage drop across the precision resistor. Only pulses from a pulse generating circuit are passed through the TRIAC element which are required for measuring the switch on threshold. The pulse generating circuit is synchronized via a null detector with the null passage of AC voltage that powers the circuit and the soldering tool.

The circuit arrangement according to the invention can be produced at low cost. In particular it requires no heat sensor in the region of the soldering bit or of the heating unit of the electrical soldering tool. According to the invention, only a precision resistor and a TRIAC switching element are inserted in the heating circuit of the heating unit. The TRIAC switching element is switched open in particular as a function of the voltage drop at the precision resistor.

As the heating unit, a heating coil or a ceramic heating element may be used. What is essential is that the heating unit presents PTC behavior or possibly also NTC behavior. The heating unit to be used according to the invention has a cold/hot ratio of 4:1, for example, whereas in conventional heating units, e.g. in soldering irons, this ratio is 1:1, that is, they have no measurable temperature coefficient.

Essential in the instant invention, is the fact that the circuit arrangement carries out a continual switching between measuring and heating, the existing heating unit being utilized simultaneously as temperature measuring element, that is, the heating unit has a dual use.

Another object of the invention is to provide such a circuit arrangement wherein a control amplifier circuit is provided which compares the voltage drop across the precision resistor with a present voltage from a voltage divider. On reaching or exceeding the preset voltage an integration capacitor within the control amplifier circuit is charged. The voltage of the capacitor controls the comparator in proportion to a reference voltage in such a way that the TRIAC element is switched on as long as the capacitor voltage is higher than the reference voltage, and is switched off as long as the capacitor voltage is lower than the reference voltage.

A still further object of the invention is to provide such a circuit arrangement wherein the integration capacitor forms a time function element for reheating the heating element after the TRIAC element has been switched off.

An advantageous control of the circuit arrangement by means of three measuring voltages is thus possible, namely the voltage drop at the precision resistor, the preset voltage at a voltage divider, and the output voltage of an integration capacitor, which forms at the same time, a time function element for the reheating of the heating unit.

Another object of the invention is to provide a circuit arrangement for controlling the operating temperature of a soldering tool which is simple in design, rugged in construction and economical to manufacture.

The various features of novelty which characterize the the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
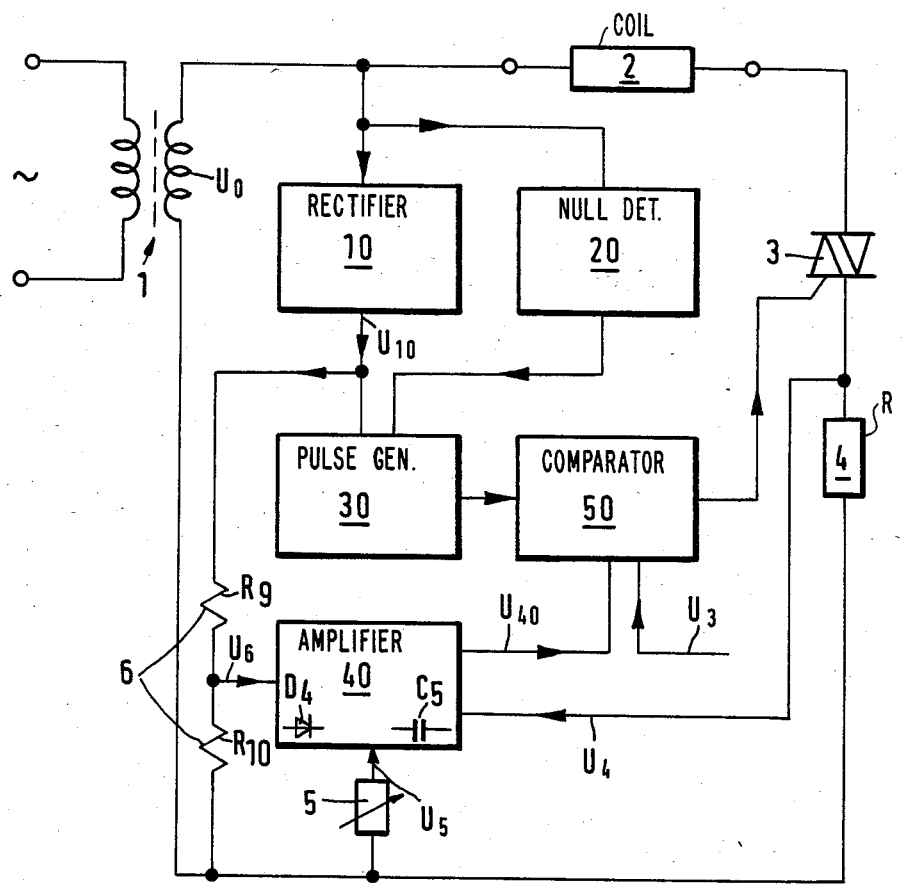
FIG. 1 is a block diagram of the inventive circuit.

Referring to the drawings in particular the invention embodied therein comprises a circuit arrangement for controlling the operating temperature of an electric soldering tool heating element, which operates in a manner that will become apparent from the description of each component of the circuit.

The block diagram of FIG. 1 shows a heating circuit which has a series connection that comprises a secondary side of a power transformer 1 as a voltage supply, a heating element or coil 2 of an electric soldering iron (not shown), the heating coil 2 having PTC properties, a switching element designed as a TRIAC 3, and a precision resistor 4. Linked with the heating circuit in the manner shown more specifically in FIG. 1 are a rectifier circuit 10, a null detector circuit 20, a pulse generator circuit 30, a control amplifier circuit 40 with a diode $D_4$ and an integration capacitor $C_5$, as well as a comparator circuit 50. A potentiometer 5 for the temperature setting of the heating coil 2 is connected between the heating circuit and the control amplifier circuit 40. A voltage divider 6, consisting of two series-connected resistors $R_9$ and $R_{10}$, is connected between the output of the rectifier circuit 10 and the heating circuit and is linked between the two resistors $R_9, R_{10}$ with the circuit 40.

The line voltage of transformer 1 is established on the secondary side at $U_0 = 25$ V and is supplied to the rectifier circuit 10. Here the operating voltage $U_{10}$ for the circuits 30, 40 and 50, each containing an IC section, and the reference voltage $U_3$ present at the non-inverting input of the comparator circuit 50 are established. After application of the line voltage at transformer 1 and presence of the operating voltage $U_{10}$ at the output of the rectifier circuit 10, the pulse generator circuit 30 starts to deliver high-frequency pulses in ¼ second rhythm. These pulses are synchronized with the pull passage of the AC voltage by the null detector circuit 20 (that is for every 15 Hz of 60 cycle AC power). The pulses, having a width of about 5 ms, go to an OR input of the comparator 50, which thereupon drives the TRIAC switching element 3 and connects it through for the positive half-wave of the AC voltage.

During current flow through the heating coil 2 of the soldering iron, a voltage drop $U_4$ occurs at the precision resistor 4. It is compared in the control amplifier circuit 40 with the voltage $U_5$ at the potentiometer 5 serving for temperature adjustment of the heating coil 2 and with the preset voltage $U_6$ at the voltage divider 6 which is derived from the uncontrolled operating voltage $U_{10}$. As soon as the voltage drop $U_4$ at the precision resistor 4 exceeds the preset voltage $U_6$, the control amplifier circuit 40 charges, via the diode $D_4$, the capacitor $C_5$, which forms a time function element. If this voltage $U_{40}$ exceeds the reference voltage $U_3$ present at the non-inverting input of comparator 50, the comparator 50 and also the TRIAC switching element 3 remain connected through. Consequently the voltage supply for the heating element 2 is maintained, so that the heating element 2 remains switched on. If the voltage $U_4$ at the precision resistor 4 falls due to rising temperature of the heating coil 2 with PTC behavior, then the control amplifier circuit 40 switches off again. The capacitor $C_5$ is discharged via a high-resistance resistor $R_{18}$ (FIG. 2) connected in parallel. As soon as the voltage $U_{40}$ at capacitor $C_5$ drops below the reference voltage $U_3$ of comparator 50, the latter switches the TRIAC element 3 off again. As a result, also the heating coil 2 of the soldering iron is turned off. Due to the time function element formed by the integration capacitor $C_5$, a certain hysteresis results, which causes the heating coil 2 of the soldering iron to reheat somewhat. This leads to faster attainment of the set end temperature.

Thereafter again only the clock pulses of the pulse generator 30 get to the TRIAC switching element 3. This process continues to take place until the voltage drop $U_4$ at the precision resistor 4 again exceeds the present voltage $U_6$ at the voltage divider 6 at the set temperature. This leads to a renewed switching on of the heating coil 2 of the soldering iron.

Figure 2:
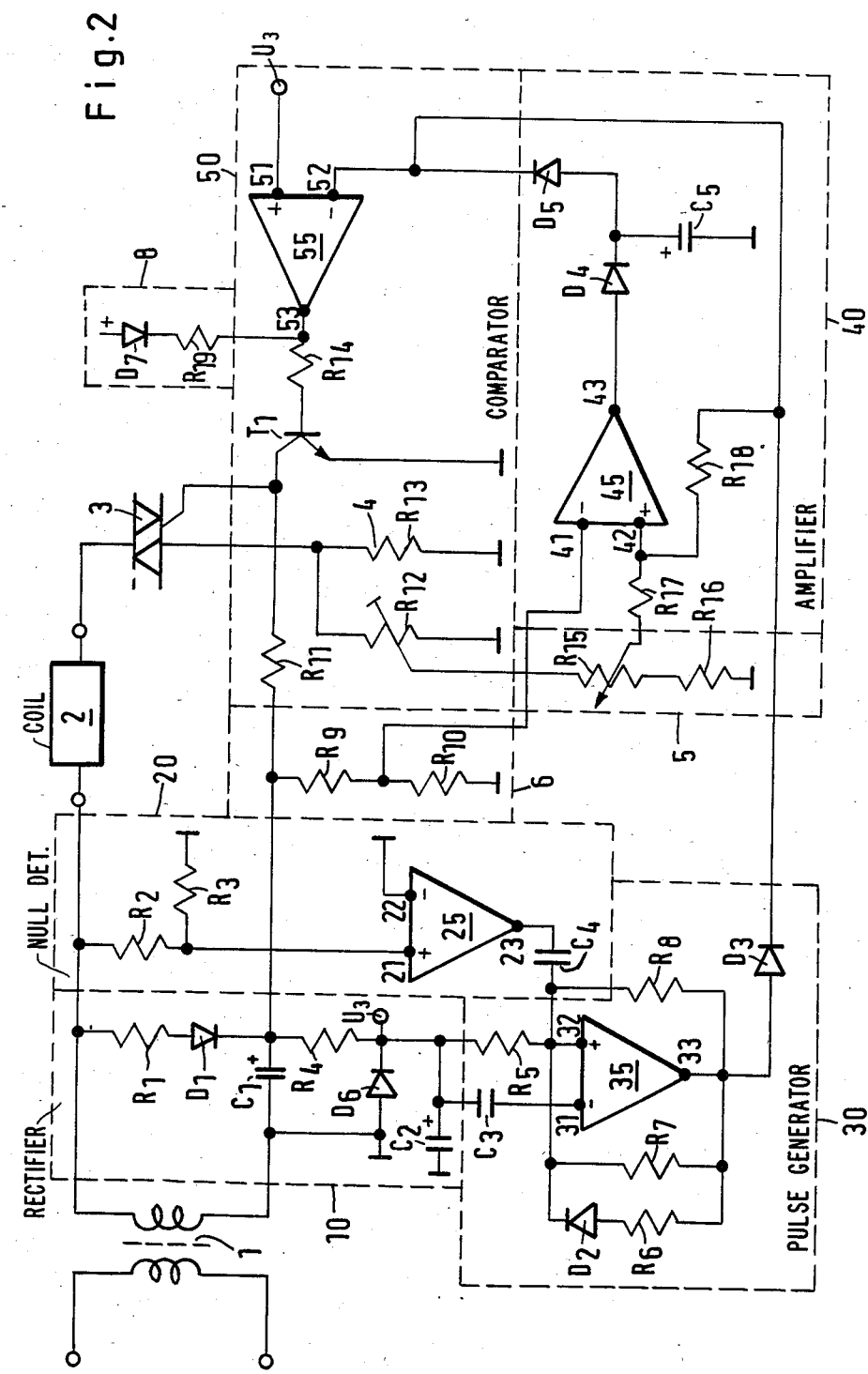
FIG. 2 is a circuit diagram of the arrangement.

In the circuit diagram of the arrangement per FIG. 2, the circuits 10, 20, 30, 40 and 50 are illustrated in fields separated by broken lines.

The rectifier circuit 10, shown directly following the power transformer 1, contains in a circuit connected in parallel with the secondary side of the power transformer 1, in series a resistor $R_1$, a diode $D_1$, another resistor $R_4$, and another diode $D_6$ in opposition to diode $D_1$, with two capacitors $C_1$ and $C_2$ connected in parallel therewith. Between resistor $R_4$ and diode $D_6$, the reference voltage $U_3$ supplied to the non-inverting input 51 of the comparator circuit 50 is taken off.

The null detector circuit 20 comprises an IC section 25, the non-inverting input 21 of which is linked via a resistor $R_2$ with the heating circuit between the secondary side of the power transformer 1 and the heating coil 2, and the inverting input 22 of which is linked directly with the heating circuit (i.e. ground). A resistor $R_3$ is connected between resistor $R_2$ and input 21 and coupled with the heating circuit. The output 23 of the IC section 25 is coupled with the pulse generator circuit 30 via a capacitor $C_4$.

The pulse generator circuit 30 comprises an IC section 35, whose inputs 31 and 32 are connected via a capacitor $C_3$, a resistor $R_5$ respectively, to the linked outputs of resistor $R_4$, diode $D_6$ and capacitor $C_2$ of the rectifier circuit 10. Between the input 32 and resistor $R_5$ there are connected the capacitor $C_4$ of the null detector circuit 20 and an additional resistor $R_8$ which is connected with the output 33 of the IC section 35. In parallel with the connection between the inputs and outputs 31, 33, another resistor R is connected. A series connection consisting of the resistor $R_6$ and diode $D_2$ is connected in parallel with $R_7$. The output 33 of the IC section 35 leads via a diode $D_3$ to the inverting input 52 of the IC section 55 of the comparator circuit 50.

The control amplifier circuit 40 comprises an IC section 45, the inverting input 41 of which is connected between the resistors $R_9$ and $R_{10}$ of the voltage divider 6. The non-inverting input 42 is connected via a resistor $R_{17}$ with the tap of resistor $R_{15}$ of potentiometer 5 for temperature adjustment and via the high resistance resistor $R_{18}$ with the connecting line to the input 52 of the IC section 55 of the comparator circuit 50. The output 43 of the IC section 45 is likewise connected with the input 52 of the IC section 55 of circuit 50 via two series-connected reverse-blocking diodes $D_4$ and $D_5$. Between the two diodes $D_4$ and $D_5$ is connected the integration capacitor $C_5$, whose other connection is applied to the heating circuit. Between resistor $R_{15}$ of potentiometer 5 and the heating circuit, a resistor $R_{16}$ is inserted.

The IC section 55 of the comparator circuit 50, at the non-inverting input 51 of which the reference voltage $U_3$ is applied and whose inverting input 52 is connected via the reverse-blocking diodes $D_5$ and $D_4$ with the output 43 of the IC section 45 of the control amplifier circuit 40 and simultaneously via the likewise reverse blocking diode $D_3$ with the output 33 of the IC section 35 of the pulse generator circuit 30, is connected by its output 53 via a resistor $R_{14}$ with the base of a transistor $T_1$ whose emitter is connected with the heating circuit and whose collector is connected with one input of the TRIAC switching element 3, whose other input is connected via the precision resistor 4 (resistor $R_{13}$) with the heating circuit. The output of the TRIAC switching element 3 is connected directly with the heating element 2. Parallel to resistor $R_{13}$ is connected a resistor $R_{12}$ which is provided for the presetting of the potentiometer 5 formed by resistor $R_{15}$. Lastly the collector of transistor $T_1$ is linked via a resistor $R_{11}$ both with the resistor $R_9$ of the voltage divider 6 and with the rectifier circuit 10 between the diode $D_1$, capacitor $C_1$ and resistor $R_4$.

Further, a light-emitting diode $D_7$ for indication of the operative state is connected with the output 53 of the IC section 55 of the comparator circuit 50 via a resistor $R_{19}$ (circuit 8).

While a specific embodiment of the invention has been shown and described in detail to illustrate the application of the principles of the invention, it will be understood that the invention may be embodied otherwise without departing from such principles.

What is claimed is:

1. A circuit arrangement for controlling the operating temperature of a heating element in an electrical soldering tool, comprising:
- a heating circuit including a soldering tool heating element, a precision resistor for monitoring a current flowing through the heating element and a triac switching element connected between the precision resistor and the heating element, the triac having a control gate for opening and closing the triac to respectively block or pass current to the heating element and a switch-on threshold;
- a comparator connected to the control gate of the triac for switching the triac open as a function of the voltage drop across the precision resistor;
- a null detector connected to the heating circuit for detecting the passage of a null in AC voltage supplied to the heating circuit;
- a pulse generator connected to the null detector and the comparator for generating pulses to operate the comparator to switch the triac element closed according to the pulses for measuring the switch-on threshold for the triac element when the comparator has switched the triac element open as a function of the voltage drop across the precision resistor; and
- a control amplifier circuit connected to the precision resistor for receiving the voltage drop across the precision resistor and for receiving a preset voltage, said control amplifier comparing said voltage drop across said precision resistor with said preset voltage, said control amplifier connected to one input of said control comparator, an integration capacitor in said control amplifier and means for applying a reference voltage to another input of said comparator, said control amplifier circuit charging said integration capacitor when the voltage drop across the precision resistor at least reaches the preset voltage, the integration capacitor being charged to a charge voltage and connected to the comparator for operating the comparator with the charged voltage which is compared to the reference voltage in such a way that the triac element is switched closed as long as the charged voltage is higher than the reference voltage and is switched open as long as the charge voltage is lower than the reference voltage, the integration capacitor thus forming a time function element for reheating the heating element after the triac element has been switched open.

2. A circuit arrangement according to claim 1, wherein the triac is closed for reheating the heating element when the voltage drop across the precision resistor is greater than the preset voltage, a voltage divider connected to the control amplifier for supplying the preset voltage, the triac element operating to renew heating of the heating element also when the charge voltage of the integrated capacitor exceeds the reference voltage.

3. A circuit arrangement according to claim 2, including a power supply connected to said heating circuit, a rectifier connected to said power supply for generating an uncontrolled DC voltage, said voltage divider connected to said rectifier for receiving said uncontrolled DC voltage.

4. A circuit arrangement according to claim 1, wherein the comparator, the pulse generator, null detector and the control amplifier include an IC section having a non-inverting input and an inverting input, a non-inverting input of the IC circuit forming said null detector connected to a portion of said heating circuit for receiving an AC voltage and an inverting input of said null detector connected to ground, so that upon transition of the AC voltage from negative to positive potential with respect to ground, an output of said null detector IC section jumps to a positive signal, the IC circuit forming said pulse generator having an non-inverting input, a capacitor connected between said null detector output and said non-inverting input of said pulse generator whereby pulses from said pulse generator are synchronized with the passage through a null position of the AC voltage powering said heating circuit.

5. A circuit for controlling the operating temperature of a heating element in an electric soldering tool, comprising:
- power supply means for supplying an AC voltage;
- rectifier means connected to said power supply means for providing a reference voltage ($U_3$) and an operating voltage ($U_{10}$);
- null detector means connected to said power supply for generating a null signal as the AC voltage passes through a zero potential;
- a soldering tool heating element;
- a precision resistor and a triac connected in series with said heating element and power supply means, said triac having a control gate for turning said triac on to pass current to the heating element after reaching a switch-on threshold and off to block current to the heating element, and the precision resistor having a voltage drop ($U_4$) thereacross when current is supplied to the heating element;
- a pulse generator connected to said null detector, to said rectifier means and to said triac gate, for generating a pulse train from said null signal and turning said triac on by pulses of said pulse train to measure the switch-on threshold of said triac, said pulse generator operating with said operating voltage;
- voltage divider means connected to said power supply means for providing a preset voltage ($U_6$) for the heating element;
- control amplifier means connected to said voltage divider means and having an integrating capacitor chargeable to a charge voltage ($U_{40}$) said control amplifier means having an input and said precision resistor connected to said control amplifier means input; and
- a comparator connected to said integrating capacitor of said control amplifier means with an output connected to said gate, for comparing the charged voltage with the reference voltage, the charged voltage being a function of the preset voltage, said comparator functioning to turn said triac on when the charged voltage is higher than the reference voltage and to turn the triac off when the charged voltage is less than the reference voltage.

* * * * *